United States Patent
Yamamuro

(10) Patent No.: US 11,126,661 B2
(45) Date of Patent: Sep. 21, 2021

(54) VOICE RECOGNITION APPARATUS

(71) Applicant: Mitsubishi Electric Corporation, Tokyo (JP)

(72) Inventor: Keita Yamamuro, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 163 days.

(21) Appl. No.: 16/326,643

(22) PCT Filed: Oct. 19, 2016

(86) PCT No.: PCT/JP2016/080919
§ 371 (c)(1),
(2) Date: Feb. 19, 2019

(87) PCT Pub. No.: WO2018/073907
PCT Pub. Date: Apr. 26, 2018

(65) Prior Publication Data
US 2020/0380040 A1 Dec. 3, 2020

(51) Int. Cl.
*G06F 16/90* (2019.01)
*G06F 16/9032* (2019.01)
*G10L 15/22* (2006.01)
*G10L 15/26* (2006.01)

(52) U.S. Cl.
CPC ........ *G06F 16/90332* (2019.01); *G10L 15/22* (2013.01); *G10L 15/26* (2013.01)

(58) Field of Classification Search
None
See application file for complete search history.

(56) References Cited

U.S. PATENT DOCUMENTS 6,366,906 B1 * 4/2002 Hoffman ............... G06F 16/957
9,202,220 B2 * 12/2015 Faber ................. G06Q 30/0277
10,394,771 B2 * 8/2019 Lin ..................... G06F 16/2443
(Continued)

FOREIGN PATENT DOCUMENTS

JP 2003-15688 A 1/2003
JP 2004-61576 A 2/2004

OTHER PUBLICATIONS

German Office Action issued in corresponding German Application No. 11 2016 007 158.2 dated Jul. 29, 2019.
(Continued)

*Primary Examiner* — Neeraj Sharma
(74) *Attorney, Agent, or Firm* — Birch, Stewart, Kolasch & Birch, LLP

(57) ABSTRACT

Provided is a technique of preventing incorrect execution of a search function that is not intended by a user. A voice recognition apparatus includes an acquisition unit, an estimation unit, an execution frequency storage, and a controller. The acquisition unit acquires a voice. The estimation unit estimates a search function to be executed, by recognizing the voice acquired by the acquisition unit. The execution frequency storage stores the execution frequency of the search function. The controller refers to the execution frequency of an estimation search function, and then controls the execution of the estimation search function. The estimation search function is the search function estimated by the estimation unit.

9 Claims, 10 Drawing Sheets

(56) References Cited

U.S. PATENT DOCUMENTS

| | | | | |
|---|---|---|---|---|
| 2002/0030697 A1* | 3/2002 | Oikawa | ................ | G06F 16/955 |
| | | | | 715/707 |
| 2003/0172082 A1* | 9/2003 | Benoit | ................ | G06F 16/9038 |
| 2004/0148164 A1* | 7/2004 | Baker | ..................... | G10L 15/08 |
| | | | | 704/231 |
| 2004/0172256 A1 | 9/2004 | Yokoi et al. | | |
| 2006/0136570 A1* | 6/2006 | Pandya | .................. | H04L 69/16 |
| | | | | 709/217 |
| 2008/0021884 A1* | 1/2008 | Jones | ................... | G06F 16/951 |
| 2010/0180238 A1* | 7/2010 | Lanfermann | .......... | G16H 40/63 |
| | | | | 715/865 |
| 2012/0158695 A1* | 6/2012 | Stuart | ................ | G06F 16/2455 |
| | | | | 707/713 |
| 2012/0233145 A1* | 9/2012 | Howes | .................. | G06Q 30/02 |
| | | | | 707/706 |
| 2013/0322462 A1* | 12/2013 | Poulsen | .................... | H04J 3/06 |
| | | | | 370/458 |
| 2014/0019542 A1* | 1/2014 | Rao | ................... | G06Q 30/0269 |
| | | | | 709/204 |
| 2014/0074810 A1* | 3/2014 | Wang | ................... | G06F 16/951 |
| | | | | 707/696 |
| 2015/0317309 A1* | 11/2015 | Farrell | ............. | G06F 16/24578 |
| | | | | 707/725 |

OTHER PUBLICATIONS

International Search Report (PCT/ISA/210) issued in PCT/JP2016/080919, dated Jan. 10, 2017.

* cited by examiner

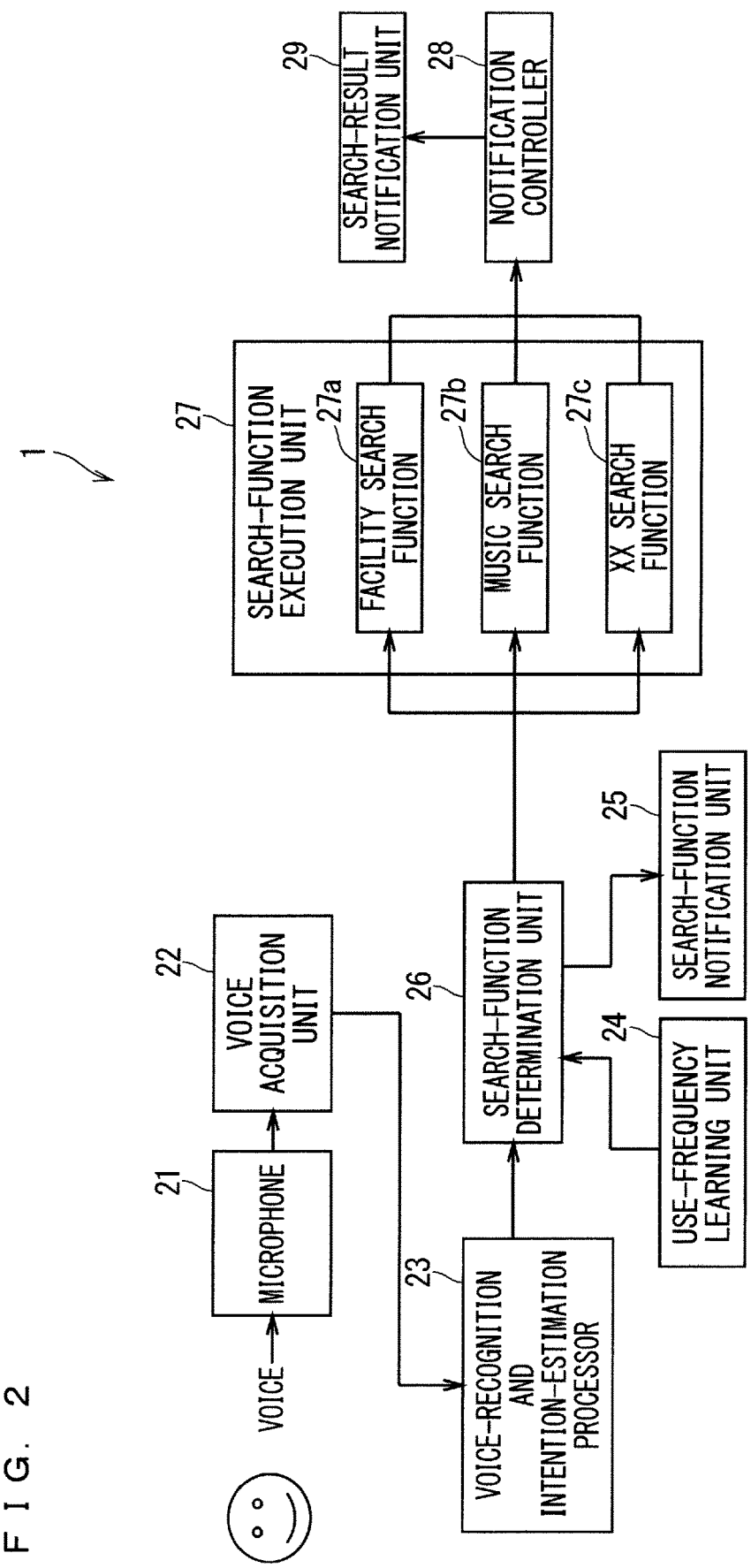
F I G. 2

VOICE RECOGNITION APPARATUS

TECHNICAL FIELD

The present invention relates to voice recognition apparatuses that recognize voices, and to voice recognition methods.

BACKGROUND ART

Various techniques have been recently proposed that relate to voice recognition apparatuses installed in apparatuses, such as car navigation apparatuses and smartphones. The technique disclosed in Patent Document 1, for instance, achieves highly accurate voice recognition using the scores of voice recognition results.

Besides such a technique, a voice recognition apparatus has been proposed that estimates a user's intention from a voice content. This type of voice recognition apparatus selects, through one-time voice recognition, one of a plurality of search functions, such as a route search function, a music search function, and a facility search function, and then executes the selected search function to search for a desired target. For instance, upon receiving the user's voice "I want to go to X Baseball Stadium", the voice recognition apparatus estimates that the "route search function" is requested, from the voice phrase "want to go", and determines that "X Baseball Stadium" is the destination in the route search function.

PRIOR ART DOCUMENTS

Patent Documents

Patent Document 1: Japanese Patent Application Laid-Open No. 2003-15688

SUMMARY

Problem to be Solved by the Invention

The aforementioned voice recognition apparatus, which estimates an user's intention, reduces the number of interactions between the user and the voice recognition apparatus. The voice recognition apparatus, however, requires complex processing, such as voice recognition and user-intention estimation based on only several times of user's voice, and information search based on recognition results and intention estimation results. As a result, the voice recognition apparatus often incorrectly executes a search function that is not intended by the user. Take the Japanese language for example. The wording "want to go (in Japanese Romanization, ikitai)" and the wording "want to hear (in Japanese Romanization, kikitai)" sounds similar. If the user speaks, "I want to go to X Baseball Stadium", in Japanese, the aforementioned voice recognition apparatus can provide search results about X Baseball Stadium obtained from the executed route search function, and search results about X Baseball Stadium obtained from the executed music search function. As a result, the voice recognition apparatus also executes a search function that is not intended by the user. Although the scores of voice recognition results can reduce incorrect search results during search function execution, such scores are not intended for a determination on which search function should be executed.

To solve the above problem, it is an object of the present invention to provide a technique for preventing incorrect execution of a search function that is not intended by a user.

Means to Solve the Problem

A voice recognition apparatus according to the present invention includes the following: an acquisition unit that acquires a voice; an estimation unit that estimates a search function to be executed, by recognizing the voice acquired by the acquisition unit; an execution frequency storage that stores the execution frequency of the search function; and a controller that refers to the execution frequency of an estimation search function, and then controls the execution of the estimation search function, the estimation search function being the search function estimated by the estimation unit.

Effects of the Invention

The voice recognition apparatus in the present invention refers to the execution frequency of the estimation search function, and then controls the execution of the estimation search function. This prevents the incorrect execution of the search function that is not intended by the user.

These and other objects, features, aspects and advantages of the present invention will become more apparent from the following detailed description of the present invention when taken in conjunction with the accompanying drawings.

BRIEF DESCRIPTION OF DRAWINGS

FIG. 2 is a block diagram of the configuration of a voice recognition apparatus according to a second embodiment.

DESCRIPTION OF EMBODIMENT(S)

First Embodiment

Figure 1:
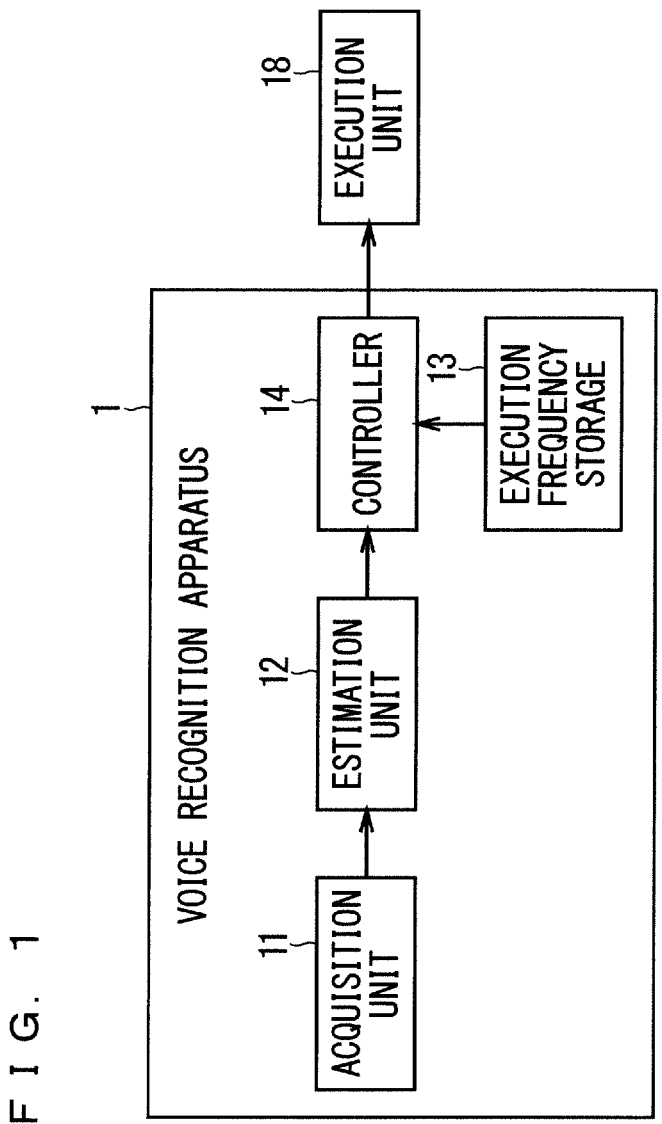
FIG. 1 is a block diagram of the configuration of a voice recognition apparatus according to a first embodiment.

FIG. 1 is a block diagram of the configuration of a voice recognition apparatus 1 according to a first embodiment. The voice recognition apparatus 1 in FIG. 1 is capable of controlling search function execution performed by an execution unit 18. It is noted that the execution unit 18 may be located outside or inside the voice recognition apparatus 1.

As clearly seen from the below description, the voice recognition apparatus 1 according to the first embodiment is capable of preventing the execution unit 18 from incorrectly executing a search function that is not intended by a user. A search function herein is a function of searching for a target instructed about a predetermined item. Examples of the search function include a route search function of searching for a route to an instructed destination, a music search function of searching for an instructed music piece, a facility search function of searching for an instructed facility, and a web search function of searching the Web for an instructed item.

Back to FIG. 1, the voice recognition apparatus 1 includes an acquisition unit 11, an estimation unit 12, an execution frequency storage 13, and a controller 14. The following details the components of the voice recognition apparatus 1.

The acquisition unit 11 acquires a voice.

The estimation unit 12 estimates a search function to be executed from among a plurality of predetermined search functions, by recognizing the voice acquired by the acquisition unit 11.

It is noted that when the content of the voice acquired by the acquisition unit 11 does not contain the search function literally, the estimation unit 12 may be capable of intention estimation processing of estimating a search function intended by the user from the content of the voice. Let the content of the voice acquired by the acquisition unit 11 indicate that the user wants to go to X Baseball Stadium. Then, the estimation unit 12 is capable of estimating a "route search function" to be the search function to be executed, and estimating X Baseball stadium to be the destination instructed in the route search function.

The execution frequency storage 13 stores the execution frequency of each search function. That is, the execution frequency storage 13 learns the execution frequency of each search function.

The controller 14 refers to the execution frequency, stored by the execution frequency storage 13, with regard to an estimation search function. The estimation search function is the search function estimated by the estimation unit 12. The controller 14 then controls the execution unit 18 to execute the estimation search function.

Gist of First Embodiment

The voice recognition apparatus 1 according to the first embodiment enables control such that, for instance, the estimation search function is immediately executed when the estimation search function has a relatively high frequency of execution, and is not immediately executed when the estimation search function has a relatively low frequency of execution. Here, an estimation search function having a relatively high frequency of execution is probably a search function that is intended by the user. Moreover, an estimation search function having a relatively low frequency of execution is probably a search function that is not intended by the user. As such, the aforementioned configuration prevents the execution unit 18 from executing a search function that is not intended by the user.

Second Embodiment

FIG. 2 is a block diagram of the configuration of the voice recognition apparatus 1 according to a second embodiment. Identical or similar components between the first and second embodiments are denoted by the same reference signs. Difference components between these embodiments will be mainly described.

The voice recognition apparatus 1 in FIG. 2 includes a microphone 21, a voice acquisition unit 22, a voice-recognition and intention-estimation processor 23, a use-frequency learning unit 24, a search-function notification unit 25, a search-function determination unit 26, a search-function execution unit 27, a notification controller 28, and a search-result notification unit 29.

The microphone 21 and the voice acquisition unit 22 together correspond to the acquisition unit 11, which is described in the first embodiment with reference to FIG. 1. The voice-recognition and intention-estimation processor 23 and the use-frequency learning unit 24 respectively correspond to the estimation unit 12 and the execution frequency storage 13, which are described in the first embodiment with reference to FIG. 1. The search-function determination unit 26 and the notification controller 28 together correspond to the controller 14, which is described in the first embodiment with reference to FIG. 1. The search-function execution unit 27 corresponds to the execution unit 18, which is described in the first embodiment with reference to FIG. 1. The following details the components of the voice recognition apparatus 1 in FIG. 2.

The microphone 21 receives a user's voice, and converts the user's voice into an audio signal.

The voice acquisition unit 22 acquires the audio signal from the microphone 21, and converts the audio signal into audio data. For an analog signal being the audio signal, the voice acquisition unit 22 performs analog-digital conversion on the audio signal, thus acquiring audio data that is digital data. In so doing, the voice acquisition unit 22 may perform processing, such as a noise reduction and beamforming, in order to enhance the accuracy of conversion into digital data using, for instance, a pulse-code-modulation (PCM) method.

The voice-recognition and intention-estimation processor 23 detects audio sections from the audio data, acquired by the voice acquisition unit 22, and then extracts feature values. The voice-recognition and intention-estimation processor 23 performs voice recognition processing on the basis of the extracted feature values, thus obtaining, for instance, character string data corresponding to the audio data. The voice-recognition and intention-estimation processor 23 performs the intention estimation processing, described in the first embodiment, on the obtained character string data, thus estimating a search function to be executed. The voice-recognition and intention-estimation processor 23 thus obtains an estimation search function. In so doing, the voice-recognition and intention-estimation processor 23 also acquires the estimation score of the estimation search function during the voice recognition processing or the intention estimation processing. The estimation score indicates the possibility that the estimation search function is a search function that is intended by the user. The estimation score may be gets higher as the feature value to be subjected to the voice recognition processing more agrees with a predetermined feature value; for instance, the estimation score may be gets higher as the character string data to be subjected to the intension estimation processing more agrees with predetermined character string data. In the second embodiment, it is assumed that the estimation search function acquired by the voice-recognition and intention-estimation processor 23 is an estimation search function having the highest estimation score of estimation search functions.

The voice recognition processing and the intention estimation processing, although performed in a single functional block such as the voice-recognition and intention-estimation processor 23 in the second embodiment, may be performed in any other thing. For instance, the voice recognition processing and the intention estimation processing may be performed independently of each other in a plurality of apparatuses, such as a server and a mobile terminal.

The estimation search function, acquired in the voice-recognition and intention-estimation processor 23, is executed by the search-function execution unit 27 in some cases, and is not executed by the search-function execution unit 27 in other cases. The details will be described later on. The search-function execution unit 27, when executing the estimation search function, provides the results of search in the estimation search function. For instance, the search-function execution unit 27, when executing a music search function 27b, provides, as the results of search, the music title contained in the aforementioned character string data, a similar music title, and other things.

The use-frequency learning unit 24 stores the execution frequency of each search function. Herein, the use-frequency learning unit 24 learns to change the execution frequency of the estimation search function on the basis of whether the search result of the executed estimation search function has been used. For instance, the use-frequency learning unit 24 increases the execution frequency of the estimation search function when the search result of the executed estimation search function is selected by the user and is then used. Further, the use-frequency learning unit 24 reduces the execution frequency of the estimation search function when the search result of the executed estimation search function is not used. In such a configuration in the second embodiment, the execution frequency of the search function can be referred to as the use frequency of the search function, the number of execution times of the search function, and the number of use times of the search function. Accordingly, the execution frequency, the use frequency, the number of execution times, and the number of use times will not be distinguished from one another in the following description.

The search-function notification unit 25 notifies the user of various information pieces under the control of the search-function determination unit 26. The search-function notification unit 25 herein notifies the user of the search function estimated by the voice-recognition and intention-estimation processor 23, that is, the estimation search function. Examples of the search-function notification unit 25 include a display apparatus, such as a liquid crystal display, and an audio output apparatus, such as a speaker. For a display apparatus being the search-function notification unit 25, a display on the display apparatus is used as a notification from the search-function notification unit 25. For an audio output apparatus being the search-function notification unit 25, an audio guidance piece from the audio output device is used as a notification from the search-function notification unit 25.

The search-function determination unit 26 refers to the use frequency of the estimation search function from among the use frequencies stored in the use-frequency learning unit 24, and then controls the search-function execution unit 27 to execute the estimation search function.

Here, the use frequency of each search function is classified into a plurality of use frequency levels, that is, a plurality of execution frequency levels. The search-function determination unit 26 refers to the use frequency level to which the use frequency of the estimation search function belongs. Then, the search-function determination unit 26 controls the execution of the estimation search function, and controls the search-function notification unit 25 to notify the estimation search function.

The following describes an example where the plurality of use frequency levels are three levels: a low frequency level, an intermediate frequency level, and a high frequency level. In this configuration, when the estimation search function has a use frequency lower than a predetermined first threshold, the low frequency level, that is, a first level, is assigned to the use frequency of the estimation search function. Further, when the estimation search function has a use frequency equal to or higher than the predetermined first threshold and lower than a predetermined second threshold, the intermediate frequency level, that is, a second level, is assigned to the use frequency of the estimation search function. Still further, when the estimation search function has a use frequency equal to or higher than the predetermined second threshold, the high frequency level, that is, a third level, is assigned to the use frequency of the estimation search function.

As such, the use frequency belonging to the low frequency level is lower than the use frequency belonging to the intermediate frequency level; in addition, the use frequency belonging to the intermediate frequency level is lower than the use frequency belonging to the high frequency level. It is noted that the plurality of use frequency levels, although classified into these three levels in the above description, may be classified into two levels, or into four or more levels. The control based on the use frequency levels in the search-function determination unit 26 will be detailed later on.

The search-function execution unit 27 executes the estimation search function under the control of the search-function determination unit 26. FIG. 2 illustrates the search-function execution unit 27 capable of executing the estimation search function, which is herein a facility search function 27a, a music search function 27b, or an XX search function 27c of searching for items other than a facility and a music piece. For instance, the search-function execution unit 27, when executing the facility search function 27a, provides the results of search for the facility contained in the aforementioned character string data, and other things.

The notification controller 28 controls the search-result notification unit 29 to notify the search results obtained from the execution of the estimation search function in the search-function execution unit 27.

The search-result notification unit 29 notifies the user of the search results under the control of the notification controller 28. Examples of the search-result notification unit 29 include a display apparatus, such as a liquid crystal display, and an audio output apparatus, such as a speaker. The search-function notification unit 25 and the search-result notification unit 29 may be included together in a single apparatus, or may be individually included in a plurality of apparatuses.

Operation

Figure 3:
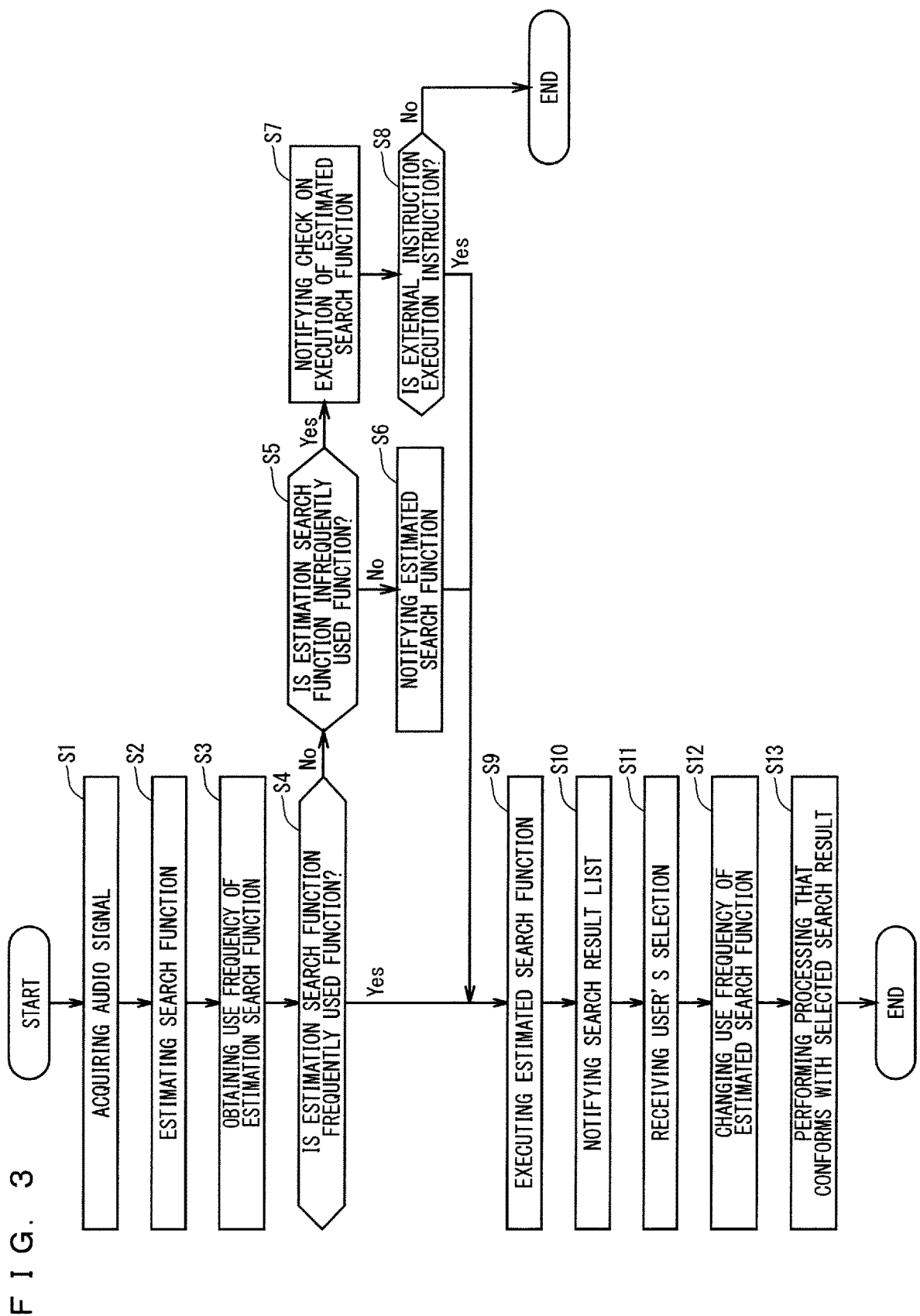
FIG. 3 is a flowchart showing the process in the voice recognition apparatus according to the second embodiment.

FIG. 3 is a flowchart showing the process in the voice recognition device according to the second embodiment.

In step S1, the voice acquisition unit 22 acquires an audio signal from the microphone 21, and converts the audio signal into audio data. In step S2, the voice-recognition and intention-estimation processor 23 estimates a search function by sequentially performing voice recognition processing and intention estimation processing on the audio data from the voice acquisition unit 22. In step S3, the search-function determination unit 26 obtains, from the use-frequency learning unit 24, the use frequency of an estimation search function, which is the search function estimated by the voice-recognition and intention-estimation processor 23.

In step S4, the search-function determination unit 26 determines whether the estimation search function is a frequently used function. Here, when the use frequency level, to which the use frequency of the estimation search function belongs, is the high frequency level, the search-function determination unit 26 determines that the estimation search function is a frequently used function, thus moving the process to step S9. When the use frequency level, to which the use frequency of the estimation search function belongs, is not the high frequency level, the search-function determination unit 26 determines that the estimation search function is not a frequently used function, thus moving the process to step S5.

In step S5, the search-function determination unit 26 determines whether the estimation search function is an infrequently used function. Here, when the use frequency level, to which the use frequency of the estimation search function belongs, is the intermediate frequency level, the search-function determination unit 26 determines that the estimation search function is not an infrequently used function, thus moving the process to step S6. When the use frequency level, to which the use frequency of the estimation search function belongs, is the low frequency level, the search-function determination unit 26 determines that the estimation search function is an infrequently used function, thus moving the process to step S7.

In step S6, the search-function determination unit 26 controls the search-function notification unit 25 to notify the estimation search function. Accordingly, the search-function notification unit 25 notifies the estimation search function. The process then proceeds to step S9.

When the process proceeds from step S5 to step S7, the search-function determination unit 26 controls the search-function notification unit 25 to notify a check on whether to execute the estimation search function, that is, a check on the execution of the estimation search function. Accordingly, for the facility search function 27a being the estimation search function, the search-function notification unit 25 notifies the user of a message saying, "Execute Facility Search, OK?".

In step S8 after step S7, the search-function determination unit 26 determines whether an external instruction is an execution instruction to execute the estimation search function notified in step S7. The external instruction may be provided through separate reception of a user's voice in the microphone 21. Alternatively, the external instruction may be provided through separate reception of a user's manual operation in an input apparatus, which is not shown. The process proceeds to step S9 if the external instruction is determined to be an execution instruction. The process in FIG. 3 ends if the external instruction is determined to be a non-execution instruction indicating that the estimation search function is not to be executed.

In step S9, the search-function determination unit 26 controls the execution of the estimation search function. The search-function execution unit 27 executes the estimation search function under this control.

Referring to step S4 through step S9 in summary, when the use frequency level is the low frequency level, the search-function determination unit 26 controls the search-function notification unit 25 to notify the estimation search function (step S7), and also controls the execution of the estimation search function in response to the external instruction. Further, when the use frequency level is the intermediate frequency level, the search-function determination unit 26 controls the search-function notification unit 25 to notify the estimation search function (step S6), and also controls the execution of the estimation search function regardless of the external instruction. Still further, when the use frequency level is the high frequency level, the search-function determination unit 26 controls the execution of the estimation search function regardless of the external instruction, without controlling the search-function notification unit 25 to notify the estimation search function.

In step S10 after step S9, the notification controller 28 makes the search-result notification unit 29 notify a list of the search results of the estimation search function as executed by the search-function execution unit 27.

In step S11, the voice recognition apparatus 1 receives user's selection of any of the notified search results. This selection may be performed through separate reception of a user's voice in the microphone 21. Alternatively, the selection may be performed through separate reception of a user's manual operation in an input apparatus, which is not shown.

In step S12, the use-frequency learning unit 24 learns to change the use frequency of the estimation search function executed in step S9, on the basis of whether the search result has been used in response to the user's selection.

In step S13, a system (not shown) connected to the voice recognition apparatus 1 runs processing that conforms with the search result as selected in step S11. For instance, when a music piece is selected, in step S11, from among a plurality of music pieces as searched for as a result of the execution of the music search function 27b, the system plays the selected music piece. The process in FIG. 3 then ends.

Gist of Second Embodiment

The voice recognition apparatus 1 according to the second embodiment refers to the use frequency level to which the use frequency of the estimation search function belongs, and then controls the execution of the estimation search function. This configuration controls the execution of the estimation search function at a suitable number of levels.

The voice recognition apparatus 1 according to the second embodiment refers to the use frequency level to which the use frequency of the estimation search function belongs, and then controls the execution of the estimation search function. The voice recognition apparatus 1 also controls the search-function notification unit 25 to notify the estimation search function. This further prevents the incorrect execution of the search function that is not intended by the user.

The voice recognition apparatus 1 according to the second embodiment changes the use frequency of the estimation search function on the basis of whether the search result of the executed estimation search function has been used. This makes the use frequency used in the search-function determination unit 26 suitable. It is noted that the use-frequency learning unit 24 may learn the use frequency in any other manner. For instance, the use-frequency learning unit 24 may change the use frequency of the estimation search function on the basis of whether the search-function execution unit 27 has executed the estimation search function.

Modification of Second Embodiment

The use frequency stored in the use-frequency learning unit 24 of the voice recognition apparatus 1 according to the second embodiment may have an initial value that is previously registered by, for instance, the user. Such a configuration enables the use-frequency learning unit 24 to learn the use frequency of a desired search function not from at the normal, low frequency level, but from at the intermediate frequency level or the high frequency level. This modification is applicable to a third embodiment and the subsequent embodiment.

Third Embodiment

Figure 4:
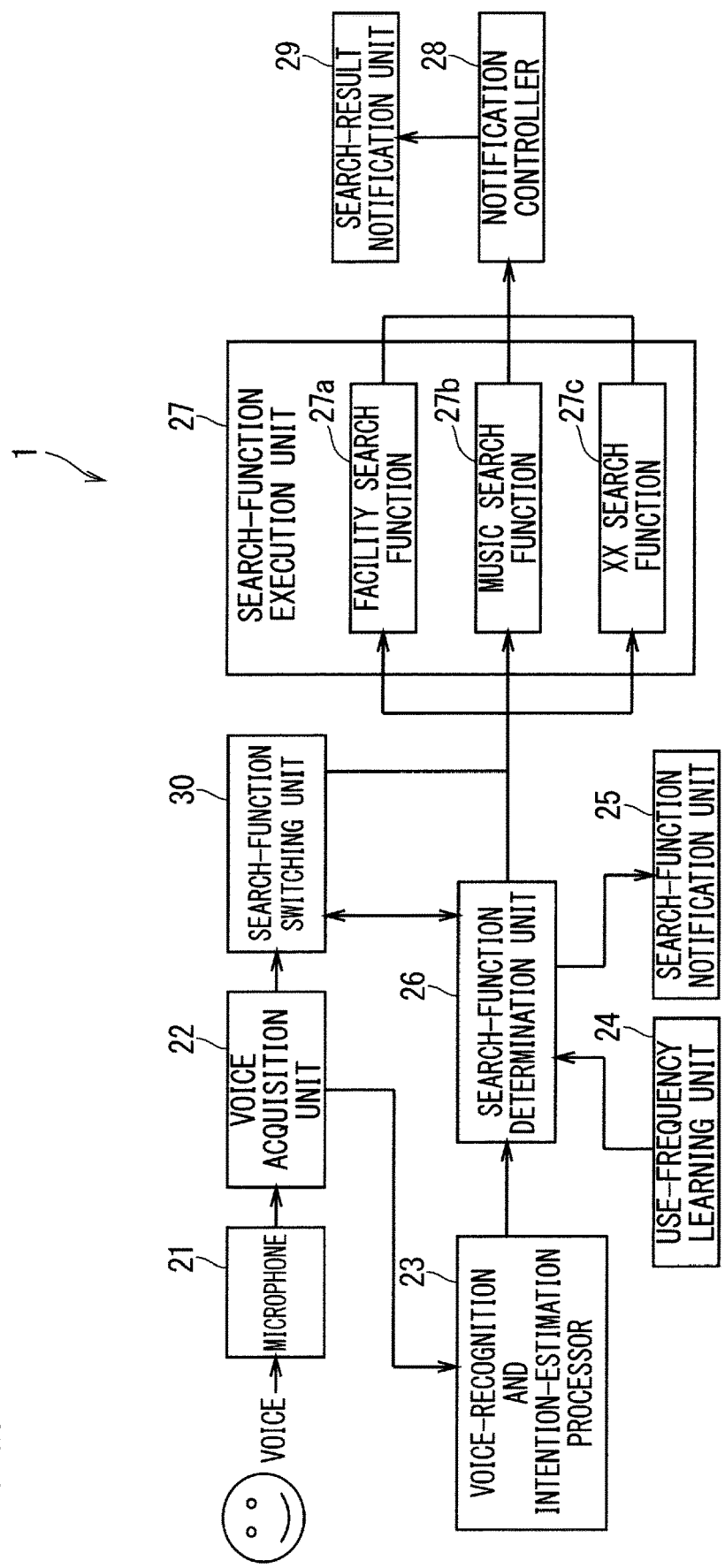
FIG. 4 is a block diagram of the configuration of a voice recognition apparatus according to a third embodiment.

FIG. 4 is a block diagram of the configuration of the voice recognition apparatus 1 according to a third embodiment. Identical or similar components between the second and third embodiments are denoted by the same reference signs. Difference components between these embodiments will be mainly described.

The voice recognition apparatus 1 in FIG. 4 further includes a search-function switching unit 30 in addition to the components in FIG. 2. The search-function determination unit 26, the notification controller 28, and the search-function switching unit 30 together correspond to the controller 14, described in the first embodiment with reference to FIG. 1.

When a plurality of estimation search functions are obtained from the estimation in the voice-recognition and intention-estimation processor 23, the search-function determination unit 26 controls the execution of one of the estimation search functions. Accordingly, the search-function execution unit 27 executes the one estimation search function. In the third embodiment, the one estimation search function has an estimation score higher than the estimation scores of the plurality of estimation search functions excluding the one estimation search function. That is, the search-function execution unit 27 in the third embodiment executes the one estimation search functions having the highest estimation score of the plurality of estimation search functions. The one estimation search having the highest estimation score of the plurality of estimation search functions is hereinafter referred to as a "highest-score search function".

The search-function switching unit 30 is capable of controlling switching from executing the one estimation search functions to executing a different one of the estimation search functions within a time period from the execution start to execution end of the one estimation search function. The search-function switching unit 30 according to the third embodiment, in cooperation with the search-function determination unit 26, controls the search-function notification unit 25 to notify one or more estimation search functions within a certain time period of the above mentioned time period. Further, the search-function switching unit 30 controls switching from executing the one estimation search function to executing the different estimation search function in response to an external instruction within the certain time period. The following first and second configuration examples are applied as such a configuration.

Reference is made to the first configuration example. The search-function switching unit 30 controls the search-function notification unit 25 to notify the plurality of estimation search functions excluding the one estimation search function in the order of use frequencies, within a certain time period during which the one estimation search function is being executed. For instance, the search-function switching unit 30 causes the search-function notification unit 25 to notify, within the aforementioned certain time period, one of the plurality of estimation search functions that is under execution. Then, when the external instruction indicates that the one under execution is not an intended search function", the search-function switching unit 30 makes the search-function notification unit 25 notify a different one of the estimation search functions that has the highest use frequency of the plurality of estimation search functions excluding the one estimation search function. The search-function switching unit 30 also controls switching from executing the one estimation search function to executing the different estimation search function.

Reference is made to the second configuration example. The search-function switching unit 30 makes the search-function notification unit 25 notify all the estimation search functions within a certain time period during which the one estimation search function is being executed. Then, in response to an external instruction to "execute a different estimation search function", the search-function switching unit 30 controls the switching from executing the one estimation search function to executing the different estimation search function that is instructed.

The example in FIG. 4 demonstrates that the external instruction is a user's voice separately received by the microphone 21, and that the audio data of the user's voice is input to the search-function switching unit 30. The external instruction may be a user's manual operation separately received by an input device, which is not shown.

Operation

Figure 5:
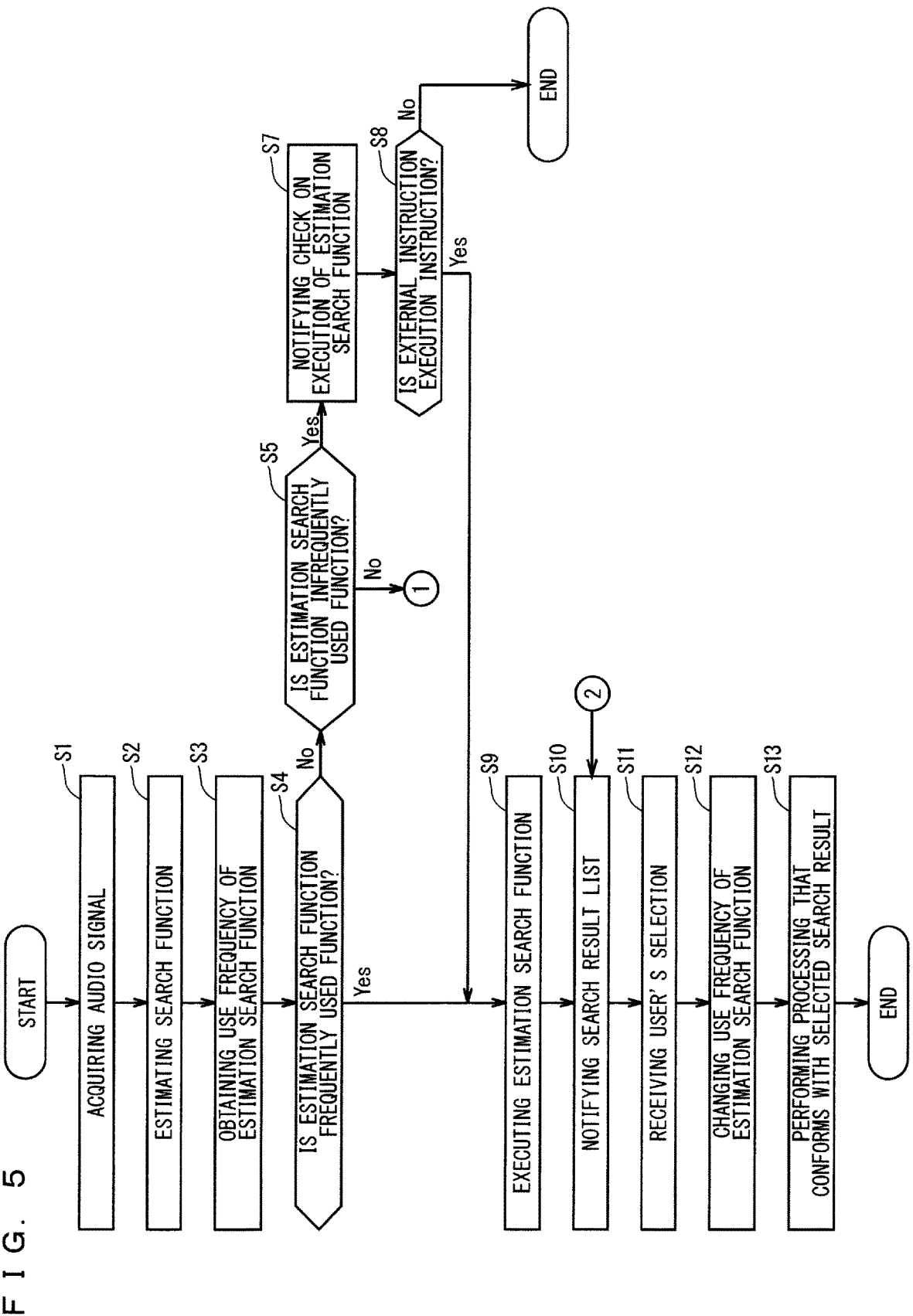
FIG. 5 is a flowchart showing the process in the voice recognition apparatus according to the third embodiment.
Figure 6:
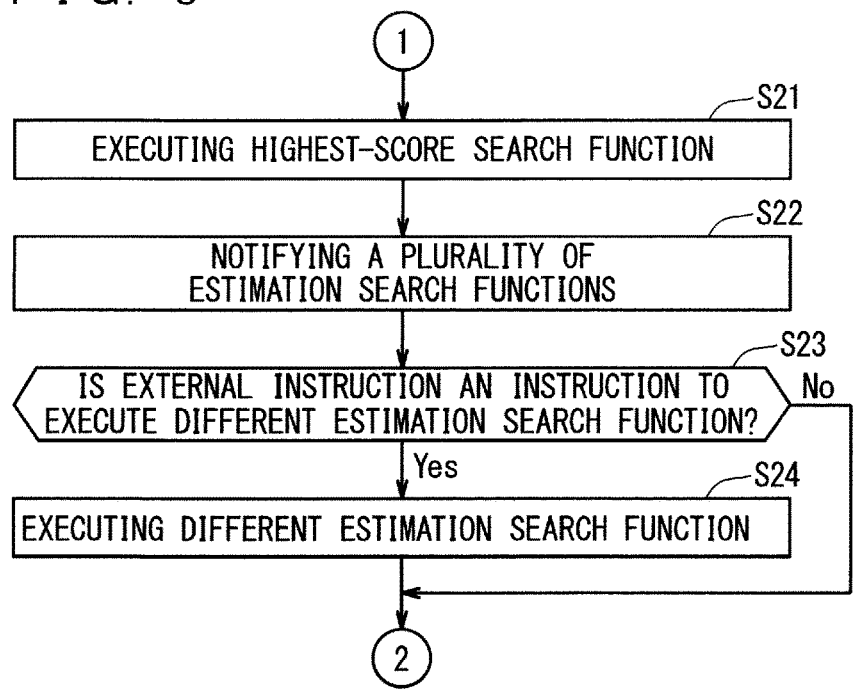
FIG. 6 is a flowchart showing the process in the voice recognition apparatus according to the third embodiment.

FIGS. 5 and 6 are flowcharts each showing the process in the voice recognition apparatus 1 according to the third embodiment. To be specific, FIGS. 5 and 6 each illustrate the process in the second configuration example. Mainly described herein are different process steps between FIG. 3 and FIGS. 5 and 6.

Steps S1 to S5 in FIG. 5 are the same as steps S1 to S5 described in FIG. 3 in the second embodiment.

Likewise, steps S7 to S13 in FIG. 5 are the same as steps S7 to S13 in FIG. 3 in the second embodiment.

In step S5 in FIG. 5, the process proceeds to step S21 in FIG. 6 if an estimation search function obtained in the voice-recognition and intention-estimation processor 23, that is, a highest-score search function, is determined to be not an infrequently used function.

In step S21, the search-function determination unit 26 controls the execution of the estimation search function, that is, the highest-score search function, which is obtained in the voice-recognition and intention-estimation processor 23. The search-function execution unit 27 executes the highest-score search function under this control.

In step S22, the search-function switching unit 30 makes the search-function notification unit 25 notify a plurality of estimation search functions including the highest-score search function.

In step S23, the search-function switching unit 30 determines whether an external instruction is an instruction to execute one of the plurality of estimation search functions that is different from the highest-score search function. The process proceeds to step S24 if the external instruction is determined to be an instruction to execute the different estimation search function. The process proceeds to step S10 in FIG. 5 if the external instruction is determined to be not an instruction to execute the different estimation search function. Moreover, the process also proceeds to step S10 in FIG. 5 when a certain time period has elapsed from the notification in step S22 without any external instruction.

In step S24, the search-function switching unit 30 controls switching to executing the different estimation search function that is instructed. The search-function execution unit 27, under this control, executes the different estimation search function that is instructed. The process then proceeds to step S10 in FIG. 5.

Gist of Third Embodiment

The plurality of estimation search functions, when estimated by the voice-recognition and intention-estimation processor 23, can be executed in the following manner: the plurality of estimation search functions are sequentially executed one by one, or the plurality of estimation search functions are simultaneously executed. Unfortunately, it can take some time before the search results are obtained in both manners.

To address this problem, the voice recognition apparatus 1 according to the third embodiment controls switching from executing one of the estimation search functions to executing a different one of the estimation search functions within a time period from the execution start to execution end of the one estimation search function. Such a configuration enables the user to change the execution of an unintended search function into the execution of an intended search function while the unintended search function is under execution. This shortens the time required to obtain the search results of the executed search function which is intended.

In the third embodiment, an estimation search function having the highest estimation score is used as one of the plurality of estimation search functions that is initially executed. This enables a search function that is probably a user's intended search function to be initially executed.

Fourth Embodiment

The block configuration of the voice recognition apparatus 1 according to a fourth embodiment of the present invention is the same as the block configuration (FIG. 4) of the voice recognition apparatus 1 according to the third embodiment. Identical or similar components between the fourth embodiment, and the second and third embodiments are denoted by the same reference signs. Difference components between these embodiments will be mainly described.

Reference is made to an instance where a plurality of estimation search functions are obtained from the estimation in the voice-recognition and intention-estimation processor 23. The search-function determination unit 26 controls simultaneous execution of the plurality of estimation search functions. Accordingly, the search-function execution unit 27 simultaneously executes the plurality of estimation search functions. The notification controller 28 controls the search-result notification unit 29 to notify the search results of the executed estimation search functions in accordance with the respective estimation search functions.

Figure 7:
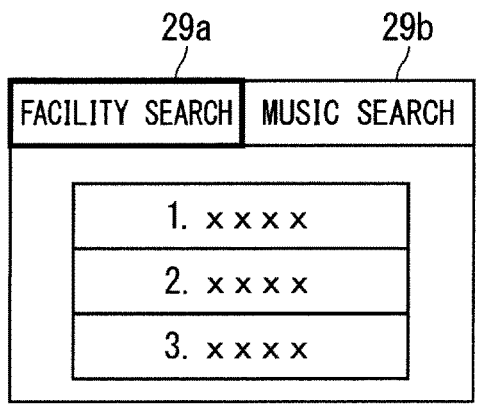
FIG. 7 is a diagram illustrating a display example in a voice recognition apparatus according to a fourth embodiment.
Figure 8:
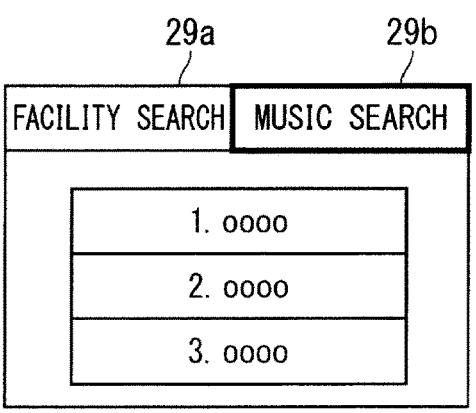
FIG. 8 is a diagram illustrating a display example in the voice recognition apparatus according to the fourth embodiment.

FIGS. 7 and 8 are diagrams illustrating display examples of notifications in the search-result notification unit 29. To be specific, FIGS. 7 and 8 illustrate display examples where a facility search function has the highest use frequency of the plurality of estimation search functions, and a music search function has the second highest use frequency behind the use frequency of the facility search function. As illustrated in FIG. 7, in the fourth embodiment, initially displayed is the search results of the facility search function, that is, the search results of the estimation search function having the highest use frequency of the plurality of estimation search functions. Furthermore, the search-result notification unit 29 has estimation search function tabs 29a and 29b. As illustrated in FIGS. 7 and 8, list displays of the search results of the estimation search functions in the search-result notification unit 29 are switched in accordance with the respective tabs 29a and 29b. That is, when the user selects the tab 29b during the display of the search results of the facility search function as illustrated in FIG. 7, the facility display switches to the display of the search results of the music search function as illustrated in FIG. 8. In addition, when the user selects the tab 29a during the display of the search results of the music search function as illustrated in FIG. 8, the music display switches to the display of the search results of the facility search function as illustrated in FIG. 7.

It is noted that the search-result notification unit 29 may notify the search results of the estimation search functions in accordance with the respective estimation search functions, in any manner other than the display switching as illustrated in FIGS. 7 and 8. For instance, the search-function notification unit 29 may display the search results of the plurality of estimation search functions on a single screen, with the search results of the estimation search functions sectioned in accordance with the respective estimation search functions by frames or other things.

Operation

Figure 9:
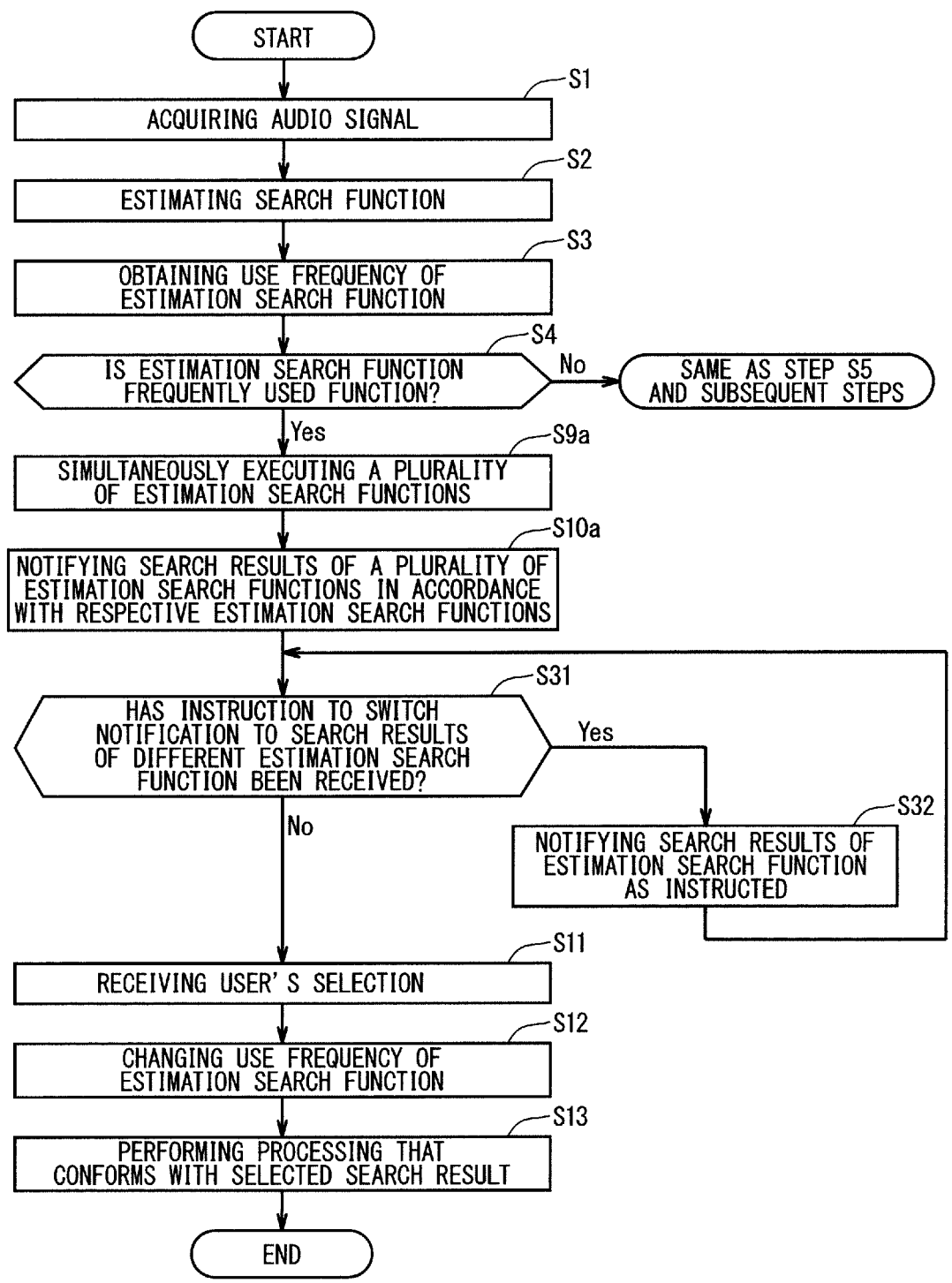
FIG. 9 is a flowchart showing the process in the voice recognition apparatus according to the fourth embodiment.

FIG. 9 is a flowchart showing the process in the voice recognition apparatus 1 according to the fourth embodiment. Mainly described herein are different process steps between FIG. 9 and FIG. 5.

The process proceeds to step S9a if a highest-score search function is determined to be a frequently used function in step S4 in FIG. 9. The same process steps as the process steps after step S5, which are described in the third embodiment with reference to FIG. 5, are performed if the highest-score search function is determined to be not a frequently used function in step S4 in FIG. 9.

In step S9a, the search-function determination unit 26 controls simultaneous execution of a plurality of estimation search functions. Accordingly, the search-function execution unit 27 simultaneously executes the plurality of estimation search functions.

In step S10a, the notification controller 28 makes the search-result notification unit 29 notify the search results of the estimation search functions in accordance with the respective estimation search functions. In so doing, the search-result notification unit 29, under the control of the notification controller 28, initially notifies the search results of an estimation search function having the highest use frequency.

In step S31, the voice recognition apparatus 1 determines whether the voice recognition apparatus 1 has received an instruction to switch the initially notified search results to the search results of a different estimation search function. The process proceeds to step S32 if the voice recognition apparatus 1 is determined to have received a switching instruction from, for instance, the user. The process proceeds to step S11 if the voice recognition apparatus 1 is determined to have received no switching instruction.

In step S32, the search-result notification unit 29, under the control of the notification controller 28, switches the initially notified search results to the search results of the estimation search function that is instructed in step S31. The process then returns to step S31.

In step S11, the voice recognition apparatus 1 receives user's selection of any of the notified search results.

In step S12, the use-frequency learning unit 24 learns to change the use frequencies of the plurality of estimation search functions executed in step S9a, on the basis of whether the search result has been used in response to the user's selection. For instance, when step S12 is performed via, for instance, step S32, the use-frequency learning unit 24 reduces the use frequency of the highest-score search function, and also increases the use frequency of the estimation search function instructed in step S31.

In step S13, a system (not shown) connected to the voice recognition apparatus 1 runs processing that conforms with the search result as selected in step S11. The process in FIG. 9 then ends.

Gist of Fourth Embodiment

When the plurality of estimation search functions are obtained from the estimation in the voice-recognition and intention-estimation processor 23, the voice recognition apparatus 1 according to the fourth embodiment controls the simultaneous execution of the plurality of estimation search functions, and also makes the search-result notification unit 29 notify the search results obtained from the simultaneous execution, in accordance with the respective estimation search functions. Such a configuration eliminates the need for redoing process steps, such as voice input, voice recognition, and intention estimation, even when an estimation search function that is initially notified is not a search function intended by the user. This enables a search result intended by the user to be instantly used.

Modification

In the voice recognition apparatus 1 according to the fourth embodiment, after the control of the simultaneous execution of the estimation search functions, the notification controller 28 may control the search-result notification unit 29 to notify, at a time point when the search results of the estimation search function having the highest use frequency is obtained, the search results of the estimation search functions obtained up to the time point. In addition, the search-result notification unit 29 may notify that a search is in progress, when the notification of the search results of the estimation search function having the highest use frequency is switched, by a tab selection or other things, to the notification of the search results of an estimation search function that has not yet been executed.

Such a configuration enables the search results of the estimation search function having the highest use frequency to be notified even when the other search functions have not yet been executed. This shortens the time required to obtain the search results of the executed estimation search function having the highest use frequency, that is, the time required to obtain the search results of an executed search function that is probably intended by the user.

In the voice recognition apparatus 1 according to the fourth embodiment, one or more of the plurality of estimation search functions may be executed by an apparatus located outside the voice recognition apparatus 1. For instance, some of the plurality of estimation search functions may be executed by a server that is capable of communicating with the voice recognition apparatus 1, and at least part of the others may be executed by a portable terminal that is capable of communicating with the voice recognition apparatus 1. Such a configuration enables the plurality of estimation search functions to be executed in a distributed manner, thereby shortening the time required to obtain the search results of the plurality of estimation search functions.

Other Modifications

Figure 10:
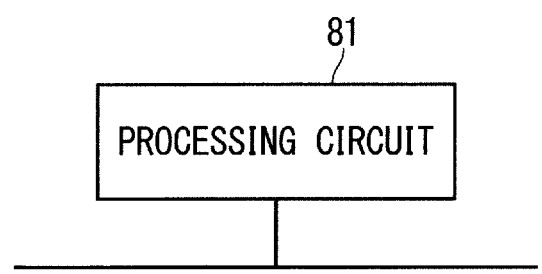
FIG. 10 is a block diagram of the hardware configuration of a voice recognition apparatus according to another modification.

The acquisition unit 11, the estimation unit 12, the execution frequency storage 13, and the controller 14 in FIG. 1, which are included in the voice recognition apparatus 1, are hereinafter referred to as "the acquisition unit 11 and the other components". The acquisition unit 11 and the other components are implemented by a processing circuit 81 illustrated in FIG. 10. That is, the processing circuit 81 includes the following: the acquisition unit 11 that acquires a voice; the estimation unit 12 that estimates a search function to be executed, by recognizing the voice acquired by the acquisition unit 11; the execution frequency storage 13 that stores the execution frequency of the search function; and the controller 14 that refers to the execution frequency of an estimation search function, and then controls the execution of the estimation search function, the estimation search function being the search function estimated by the estimation unit 12. The processing circuit 81 may be dedicated hardware or a processor to execute a program stored in a memory. Examples of the processor include a central processing unit, a processing unit, a calculator, a microprocessor, a microcomputer, and a digital signal processor (DSP).

For dedicated hardware serving as the processing circuit 81, example of the processing circuit 81 include a single circuit, a complex circuit, a programmed processor, a parallel-programmed processor, an application-specific integrated circuit (ASIC), a field-programmable gate array (FPGA), and a combination thereof. The functions of the acquisition unit 11 and the other components each may be implemented by a decentralized processing circuit. Alternatively, the functions of the acquisition unit 11 and the other components may be, all together, implemented by a single processing circuit.

Figure 11:
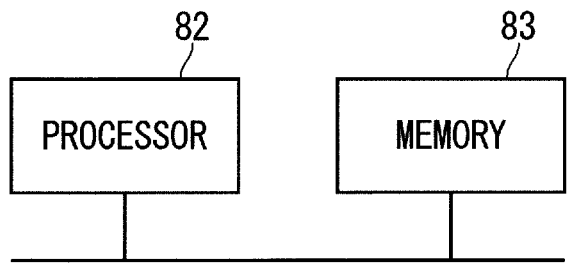
FIG. 11 is a block diagram of the hardware configuration of a voice recognition apparatus according to another modification.

For a processor serving as the processing circuit 81, the functions of the acquisition unit 11 and the other components are implemented in combination with software and other things. Examples of the software and other things include software, firmware, and a combination of software and firmware. The software and other things are written as a program, and stored in a memory. As illustrated in FIG. 11, a processor 82 serving as the processing circuit 81 reads a program stored in a memory 83 for execution, to implement the function of each component. That is, the voice recognition apparatus 1 includes the memory 83 to store a program, which, when executed by the processing circuit 81, performs the following steps: acquiring a voice; estimating a search function to be executed, by recognizing the acquired voice; storing the execution frequency of the search function; and referring to the execution frequency of an estimation search function, and then controlling the execution of the estimation search function, the estimation search function being the search function as estimated. In other words, this program causes a computer to execute the procedure or method of the acquisition unit 11 and of the other components. Here, examples of the memory 83 include a non-volatile or volatile semiconductor memory, such as a random access memory (RAM), a read only memory (ROM), a flash memory, an erasable programmable read only memory (EPROM), an electrically erasable programmable read only memory (EEPROM), and include a hard disk drive (HDD), a magnetic disc, a flexible disc, an optical disc, a compact disc, a mini disc, a digital versatile disc (DVD), and a driver thereof.

The foregoing has described that each function of the acquisition unit 11 and the other components is implemented by one of hardware, software, and other things. Some part of the acquisition unit 11 and of the other components may be implemented by dedicated hardware; and another part, by software and other things. For instance, the function of the acquisition unit 11 can be implemented by a processing circuit, which is dedicated hardware; moreover, the functions of the others can be implemented by the processing circuit 81 (i.e., the processor 82) that reads the program stored in the memory 83, and executes the program.

As described above, the processing circuit 81 implements the aforementioned individual functions using hardware, software, and other things, or using a combination thereof.

The voice recognition apparatus in the foregoing description can be used also as a voice recognition system that is established as a system by combining together, as necessary, a navigation apparatus (e.g., a portable navigation apparatus or PND for short), a communication terminal including a portable terminal (e.g., a mobile phone, a smartphone, or a tablet), the functions of applications installed therein, and a server. In this case, the individual functions or individual components of the voice recognition apparatus described above may be decentralized in the individual devices constituting this system, or may be centralized in any of these devices.

Figure 12:
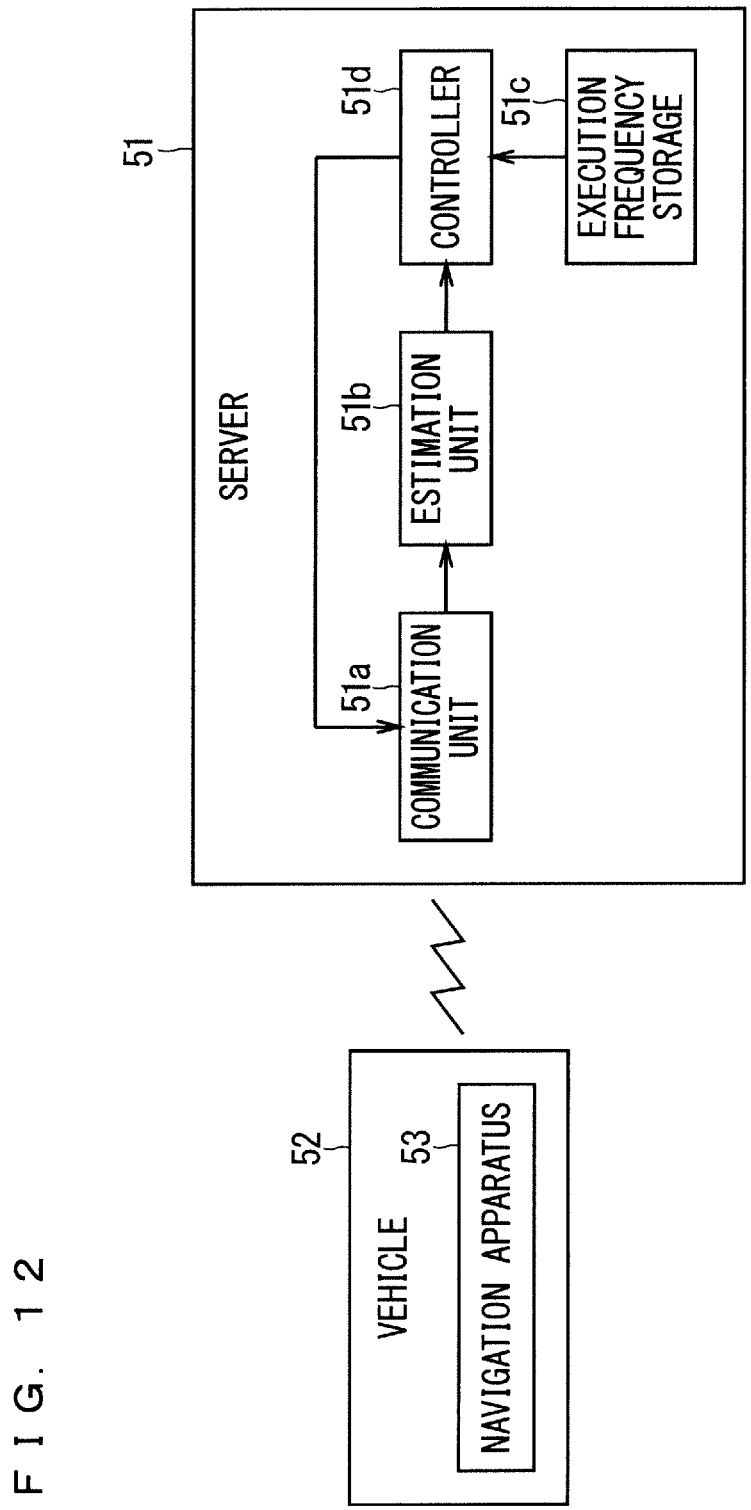
FIG. 12 is a block diagram of the configuration of a server according to another modification.

FIG. 12 is a block diagram of the configuration of a server 51 according to the present modification. The server 51 in FIG. 12 includes a communication unit 51a, an estimation unit 51b, an execution frequency storage 51c, and a controller 51d. The server 51 is capable of wirelessly communicating with a navigation apparatus 53 mounted in a vehicle 52.

The communication unit 51a, which is an acquisition unit, wirelessly communicates with the navigation apparatus 53 to receive a voice obtained in the navigation apparatus 53.

The estimation unit 51b, the execution frequency storage 51c, and the controller 51d have the same functions as those of the estimation unit 12, the execution frequency storage 13, and the controller 14 in FIG. 1 when a processor (not shown), for instance, included in the server 51 executes a program stored in a storage (not shown) included in the server 51. That is, the controller 51d refers to the execution frequency of an estimation search function, which is a search function estimated by the estimation unit 51b, and then controls the execution of the estimation search function. Further, the communication unit 51a sends, for instance, control results in the controller 51d or the search results of the executed estimation search function, to the navigation apparatus 53.

The server 51, which has such a configuration, achieves an effect similar to that achieved by the voice recognition apparatus 1 described in the first embodiment.

Figure 13:
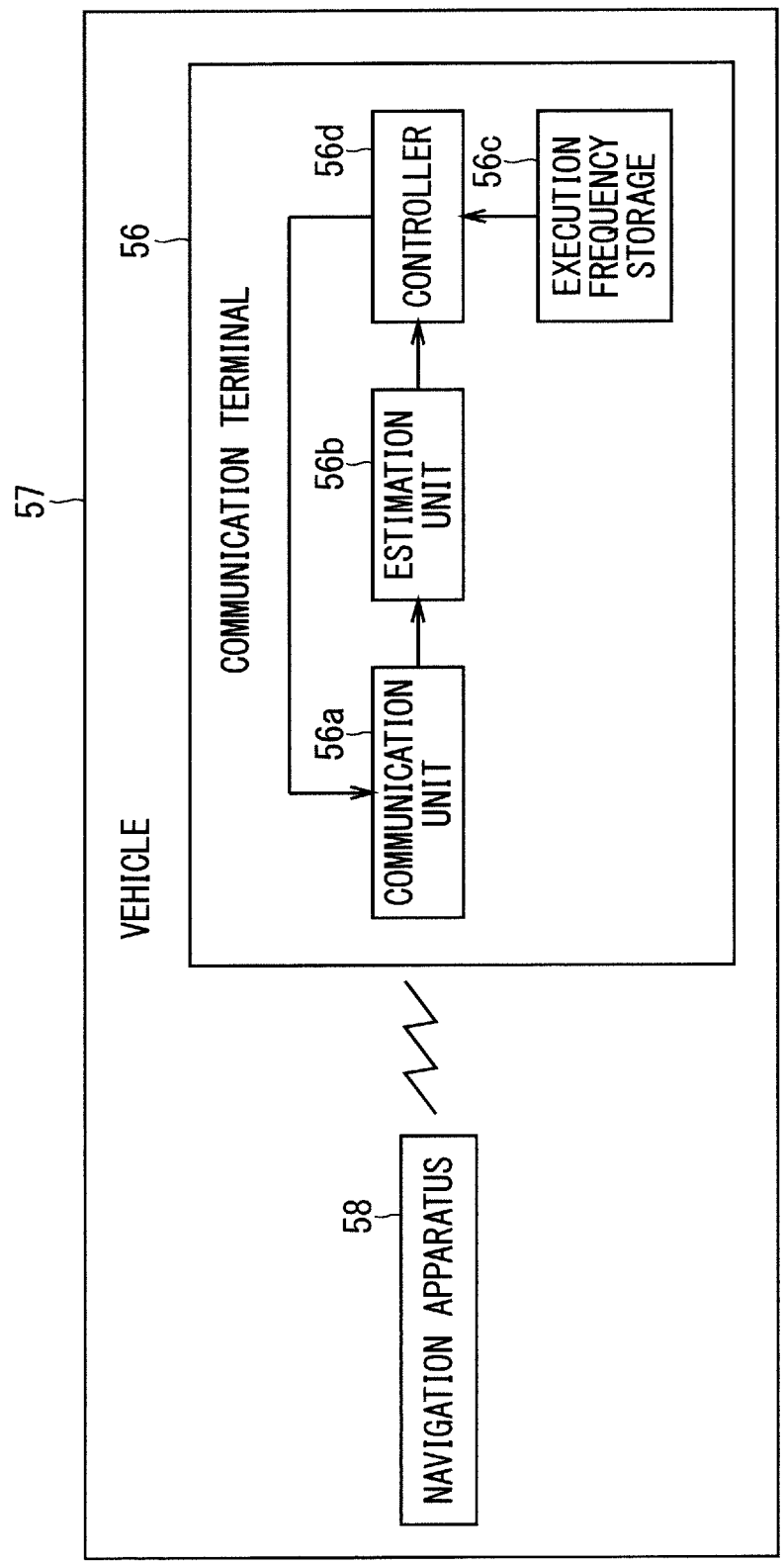
FIG. 13 is a block diagram of the configuration of a communication terminal according to another modification.

FIG. 13 is a block diagram of the configuration of a communication terminal 56 according to the present modification. The communication terminal 56 in FIG. 13 includes a communication unit 56a, an estimation unit 56b, an execution frequency storage 56c, and a controller 56d, which are identical to the communication unit 51a, the estimation unit 51b, the execution frequency storage 51c, and the controller 51d in FIG. 12. The communication terminal 56 is capable of wirelessly communicating with a navigation apparatus 58 mounted in a vehicle 57. An example of the communication terminal 56 is a portable terminal carried by the driver of the vehicle 57, such as a mobile phone, a smartphone, or a tablet. The server 56, which has such a configuration, achieves an effect similar to that achieved by the voice recognition apparatus 1 described in the first embodiment.

It is noted that in the present invention, the individual embodiments can be freely combined, or can be modified and omitted as appropriate, within the scope of the invention.

While the invention has been shown and described in detail, the foregoing description is in all aspects illustrative and not restrictive. It is therefore understood that numerous modifications and variations can be devised without departing from the scope of the invention.

EXPLANATION OF REFERENCE SIGNS 1 voice recognition apparatus, 11 acquisition unit, 12 estimation unit, 13 execution frequency storage, 14 controller, 25 search-function notification unit, 29 search-result notification unit.

The invention claimed is:

1. A voice recognition apparatus comprising:
a receiver to receive a voice of a user;
an estimator to determine an estimation search function to be executed, by recognizing the voice received by the receiver;
an execution frequency storage to store execution frequencies of a plurality of search functions including the estimation search function; and
a controller to refer to the execution frequency of the estimation search function, and to then control the execution of the estimation search function, the estimation search function being one of the plurality of search functions,
wherein the execution frequency of the estimation search function is classified into one of a plurality of predefined execution frequency levels by comparing the execution frequency of the estimation search function to predefined thresholds dividing the plurality of execution frequency levels, and
the controller refers to the execution frequency level to which the execution frequency of the estimation search function belongs, and then controls the execution of the estimation search function such that, depending on to which of the plurality execution frequency levels the estimation search functions belongs, the controller selectively performs one of (1) immediate execution of the estimation search function and (2) execution of the estimation search function after providing notification to the user.

2. The voice recognition apparatus according to claim 1, wherein
the controller controls a notification unit to notify the estimation search function.

3. The voice recognition apparatus according to claim 1, wherein
when the execution frequency level is a first level, the controller controls the notification unit to notify the estimation search function, and also controls the execution of the estimation search function in response to an external instruction,
when the execution frequency is a second level higher than the first level, the controller controls the notification unit to notify the estimation search function, and also controls the execution of the estimation search function regardless of the external instruction, and
when the execution frequency level is a third level higher than the second level, the controller controls the execution of the estimation search function regardless of the external instruction, without controlling the notification unit to notify the estimation search function.

4. The voice recognition apparatus according to claim 1, wherein the execution frequency stored in the execution frequency storage comprises an initial value that is previously registerable.

5. The voice recognition apparatus according to claim 1, wherein the execution frequency storage changes the execution frequency of the estimation search function on the basis of whether a search result of the executed estimation search function has been used.

6. A voice recognition apparatus comprising:
a receiver to receive a voice;
an estimator to estimate a search function to be executed, by recognizing the voice received by the receiver;
an execution frequency storage to store an execution frequency of the search function; and
a controller to refer to the execution frequency of an estimation search function, and to then control the execution of the estimation search function, the estimation search function being the search function estimated by the estimator,
wherein when a plurality of different estimation search functions are obtained from the estimation in the estimation unit, the controller controls simultaneous execution of the plurality of different estimation search functions, and also controls a notification unit to notify search results obtained from the simultaneous execution, in accordance with the respective estimation search functions, and
wherein, in response to an instruction from a user, the notification unit switches notification from the search results of one of the plurality of different estimation search functions to another of the plurality of different estimation search functions, and increases the execution frequency of only the another of the plurality of different estimation search functions without increasing the execution frequency of the one of the plurality of different estimation search functions.

7. The voice recognition apparatus according to claim 6, wherein
in the notification unit, notifications of the search results of the plurality of different estimation search functions are switched in accordance with the respective estimation search functions, and
the search result of the estimation search function having a highest execution frequency of the plurality of different estimation search functions is initially notified.

8. The voice recognition apparatus according to claim 6, wherein after controlling the simultaneous execution of the plurality of different estimation search functions, the controller controls the notification unit to notify, at a time point when the search result of the estimation search function having a highest execution frequency of the plurality of different estimation search functions is obtained, the search results of the plurality of different estimation search functions obtained up to the time point.

9. The voice recognition apparatus according to claim 6, wherein one or more of the plurality of different estimation search functions are executed by an apparatus located outside the voice recognition apparatus.

* * * * *